(12) United States Patent
Kim

(10) Patent No.: US 11,675,527 B2
(45) Date of Patent: Jun. 13, 2023

(54) MEMORY SYSTEM UPLOADING HOT METADATA TO A HOST BASED ON FREE SPACE SIZE OF A HOST MEMORY, AND READ OPERATION METHOD THEREOF

(71) Applicant: SK hynix Inc., Gyeonggi-do (KR)

(72) Inventor: Kwang Su Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/164,050

(22) Filed: Feb. 1, 2021

(65) Prior Publication Data

US 2021/0397365 A1   Dec. 23, 2021

(30) Foreign Application Priority Data

Jun. 22, 2020 (KR) .......................... 10-2020-0075432

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .............................. G06F 3/0655; G06F 3/0604
See application file for complete search history.

(56) References Cited

U.S. PATENT DOCUMENTS

| 2016/0179685 A1* | 6/2016 | Byun | ................. | G06F 12/0802 |
| | | | | 711/118 |
| 2022/0004489 A1* | 1/2022 | Cariello | ................. | G06F 3/061 |

FOREIGN PATENT DOCUMENTS

| KR | 10-2020-0122086 | 10/2020 |
| KR | 10-2021-0027642 A | 3/2021 |

OTHER PUBLICATIONS

Jeong, Improving flash storage performance by caching address mapping table in host memory,9th{USENIX}Workshop on Hot Topics in Storage and File Systems(HotStorage 17)[retrieved from internet Jan. 24, 2022][<URL:https://www.usenix.org/system/files/conference/hotstorage17/hotstorage17-paper-jeong.pdf>] (Year: 2017).*

\* cited by examiner

*Primary Examiner* — David Yi
*Assistant Examiner* — Nicholas A. Paperno
(74) *Attorney, Agent, or Firm* — IP & T Group LLP

(57) ABSTRACT

A memory system may include: a nonvolatile memory device suitable for storing user data and meta data of the user data; and a controller suitable for uploading at least some of the meta data to a host. When the size of a free space of a storage space of the host, allocated to store the uploaded meta data, is equal to or less than a preset value, the controller may upload hot meta data to the host according to the number of normal read requests received from the host and the ratio of the normal read requests.

18 Claims, 18 Drawing Sheets

FIG. 11A

| MAP INFO | | UPLOAD |
|---|---|---|
| LBA00 | PBA02 | 1 |
| LBA01 | PBA09 | 1 |
| LBA02 | PBA07 | 1 |
| LBA03 | PBA08 | 1 |
| LBA04 | PBA03 | 1 |
| LBA05 | PBA01 | 0 |
| LBA06 | PBA05 | 0 |
| LBA07 | PBA00 | 0 |
| LBA08 | PBA06 | 0 |
| LBA09 | PBA04 | 0 |

144

| MAP INF | |
|---|---|
| LBA00 | PBA02 |
| LBA01 | PBA09 |
| LBA02 | PBA07 |
| LBA03 | PBA08 |
| LBA04 | PBA03 |

| NO. | LBA | RD_CNT ||
| --- | --- | --- | --- |
| | | N_RD_CNT | H_RD_CNT |
| RD_REQ00 | LBA04 | 0 | 1 |
| RD_REQ01 | LBA09 | 1 | 0 |
| RD_REQ02 | LBA05 | 1 | 0 |
| RD_REQ03 | LBA05 | 1 | 0 |
| RD_REQ04 | LBA06 | 1 | 0 |
| RD_REQ05 | LBA04 | 0 | 1 |
| RD_REQ06 | LBA04 | 0 | 1 |
| RD_REQ07 | LBA05 | 1 | 0 |
| RD_REQ08 | LBA06 | 1 | 0 |
| RD_REQ09 | LBA05 | 1 | 0 |
| RD_REQ10 | LBA06 | 1 | 0 |
| RD_REQ11 | LBA07 | 1 | 0 |
| RD_REQ12 | LBA08 | 1 | 0 |
| RD_REQ13 | LBA07 | 1 | 0 |
| RD_REQ14 | LBA08 | 1 | 0 |
| RD_REQ15 | LBA05 | 1 | 0 |
| RD_REQ16 | LBA06 | 1 | 0 |
| RD_REQ17 | LBA05 | 1 | 0 |
| RD_REQ18 | LBA06 | 1 | 0 |
| RD_REQ19 | LBA08 | 1 | 0 |
| SUM | | 17 | 3 |

REF = 15EA
TH = 80%

FIG. 11C

| MAP INFO | | UPLOAD |
|---|---|---|
| LBA00 | PBA02 | 0 |
| LBA01 | PBA09 | 0 |
| LBA02 | PBA07 | 0 |
| LBA03 | PBA08 | 0 |
| LBA04 | PBA03 | 0 |
| LBA05 | PBA01 | 0 |
| LBA06 | PBA05 | 0 |
| LBA07 | PBA00 | 0 |
| LBA08 | PBA06 | 0 |
| LBA09 | PBA04 | 0 |

| LBA | RD_CNT |
|---|---|
| LBA00 | 0 |
| LBA01 | 0 |
| LBA02 | 0 |
| LBA03 | 0 |
| LBA04 | 3 |
| LBA05 | 6 |
| LBA06 | 5 |
| LBA07 | 2 |
| LBA08 | 3 |
| LBA09 | 1 |

LBA04–LBA08: HOT

FIG. 11E

| MAP INFO | | UPLOAD |
|---|---|---|
| LBA00 | PBA02 | 0 |
| LBA01 | PBA09 | 0 |
| LBA02 | PBA07 | 0 |
| LBA03 | PBA08 | 0 |
| LBA04 | PBA03 | 1 |
| LBA05 | PBA01 | 1 |
| LBA06 | PBA05 | 1 |
| LBA07 | PBA00 | 1 |
| LBA08 | PBA06 | 1 |
| LBA09 | PBA04 | 0 |

144

| MAP INF | |
|---|---|
| LBA04 | PBA03 |
| LBA05 | PBA01 |
| LBA06 | PBA05 |
| LBA07 | PBA00 |
| LBA08 | PBA06 |

106

MEMORY SYSTEM UPLOADING HOT METADATA TO A HOST BASED ON FREE SPACE SIZE OF A HOST MEMORY, AND READ OPERATION METHOD THEREOF

CROSS-REFERENCE TO RELATED APPLICATION

This application claims priority under 35 U.S.C. § 119 to Korean Patent Application No. 10-2020-0075432, filed on Jun. 22, 2020, which is incorporated herein by reference in its entirety.

BACKGROUND

1. Field

Various embodiments relate to a memory system and an operating method thereof, and more particularly, to a read operation method and apparatus for a memory system.

2. Discussion of the Related Art

Recently, the paradigm for the computing environment has changed to the ubiquitous computing environment in which computer systems can be used anytime, anywhere. Therefore, the use of portable electronic devices such as mobile phones, digital cameras and notebook computers has rapidly increased. Such portable electronic devices generally use a memory system using a memory device, i.e. a data storage device. The data storage device is used as a main memory device or secondary memory device of a portable electronic device.

Since a data storage device using a memory device has no mechanical driver unlike a hard disk, the data storage device has excellent stability and durability, high information access speed, and low power consumption. Examples of data storage devices embodied in memory systems having such advantages, include a USB (Universal Serial Bus) memory device, memory cards having various interfaces, and an SSD (Solid State Drive).

SUMMARY

Various embodiments are directed to a memory system which can decide hot map information to be uploaded to a host according to the number of read requests and the ratio of normal read requests in a Host-aware Performance Booster (HPB) mode, and an operating method thereof.

Also, various embodiments are directed to a memory system which can increase the efficiency of a read operation by updating cold map information, among pieces of map information uploaded to a host, into hot map information.

Also, various embodiments are directed to a memory system which can reduce overhead of a memory system because map information does not need to be downloaded from a memory device during a read operation by a host request, and an operating method thereof.

Also, various embodiments are directed to a memory system which can determine the validity of a physical address received from a host during a read operation, and access the corresponding physical address without a separate map information search process when the physical address is a valid physical address, thereby improving the performance speed of the read operation, and an operating method thereof.

In an embodiment, a memory system comprising: a nonvolatile memory device suitable for storing user data and metadata of the user data; and a controller suitable for uploading at least some of the metadata to a host, when the size of a free space of a storage space allocated to store the uploaded metadata within the host is equal to or less than a set value, the controller may upload hot metadata to the host according to the number of normal read may request received from the host and a ratio of the normal read may request received to all read may request received.

The normal read request may be a read request with no physical address.

When the size of the free space may be equal to or less than the set value, the controller may manage a read count indicating the number of times that a read request for a specific logical address may be made by the host.

The controller may select the hot metadata based on the read count.

The read count may comprise a normal read count for normal read may request and a Host-aware Performance Booster (HPB) read count for HPB read may request, each including a physical address.

The controller may reset upload information on at least some of the metadata uploaded to the host to upload the hot metadata to the host.

When the ratio of normal read may request to all read may request may be equal to or more than a first threshold value, the controller may upload to the host hot metadata to replace cold meta data among the uploaded meta data.

When the ratio of normal read may request to all read may request may be equal to or more than a second threshold value larger than the first threshold value, the controller may upload to the host hot metadata to replace all previously uploaded meta data.

The metadata may comprise map information including a logical address used by the host and a physical address of the memory device, corresponding to the logical address.

The set value may be equal to or more than 0.

In an embodiment, there is provided an operating method of a memory system which includes a nonvolatile memory device suitable for storing user data and metadata of the user data and a controller suitable for uploading at least some of the metadata to a host, the operating method comprising: determining whether the size of free space of a storage space allocated to store the uploaded metadata in the host is equal to or less than a set value; and uploading hot metadata to the host according to the number of normal read requests received from the host and a ratio of the normal read requests to all read requests, when the size of the free space is equal to or less than the set value.

The normal read request may be a read request with no physical address.

The uploading of the hot metadata to the host may comprise managing a read count indicating the number of times that a read request for a specific logical address may be made by the host.

The uploading of the hot metadata to the host may comprise selecting the hot metadata based on the read count.

The read count may comprise a normal read count for normal read may request and a Host-aware Performance Booster (HPB) read count for HPB read may request, each including a physical address.

The uploading of the hot metadata to the host may comprise resetting upload information on at least some of the metadata uploaded to the host.

The uploading of the hot metadata to the host may comprise uploading to the host hot metadata to replace cold meta data among the uploaded meta data, when the ratio of the normal read may request to all read may request may be equal to or more than a first threshold value.

The uploading of the hot metadata to the host may comprise uploading to the host hot metadata to replace previously uploaded metadata, when the ratio of the normal read may request to all read may request may be equal to or more than a second threshold value larger the first threshold value.

The metadata may comprise map information including a logical address used by the host and a physical address of the memory device, corresponding to the logical address.

The set value may be equal to or more than 0.

In an embodiment, a system comprising: a memory device suitable for storing device map data between logical addresses and corresponding physical addresses; a controller suitable for controlling the memory device to perform operations in response to a first type of request and a second type of request, each request of the first type including a logical address and a corresponding physical address and each request of the second type including a logical address without a physical address; and a host suitable for providing the controller with requests of the first and second types according to host map data, wherein the controller is further suitable for: providing the host with at a first portion of the device map data as the host map data; and controlling the host to replace at least some of the host map data with at least a second portion of the device map data when a number of requests of the second type is greater than a first threshold and a ratio of the number of requests of the second type to the sum of requests of the first and second types is greater than a second threshold.

In accordance with embodiments, the memory system and the operating method thereof may have the following effects.

The memory system and the operating method can increase the efficiency of the read operation by updating cold map information, among pieces of map information uploaded to a host, into hot map information.

Also, the memory system and the operating method can reduce overhead of a memory system because map information does not need to be downloaded from a memory device during a read operation by a host request.

Also, the memory system and the operating method can determine the validity of a physical address received from a host during a read operation, and access the corresponding physical address without a separate map information search process when the physical address is a valid physical address, thereby improving the performance speed of the read operation.

BRIEF DESCRIPTION OF THE DRAWINGS

FIGS. 11A to 11E are tables illustrating an operation in which a memory system in accordance with an embodiment, manages a host memory.

DETAILED DESCRIPTION

Various embodiments are described in detail below with reference to the accompanying drawings. The following descriptions focus on aspects and features of operations in accordance with embodiments; description of well-known detail is omitted in order not to unnecessarily obscure the present invention.

Embodiments of the present disclosure are described with reference to the accompanying drawings, wherein like numbers reference like elements. Also, throughout the specification, reference to "an embodiment," "another embodiment" or the like is not necessarily to only one embodiment, and different references to any such phrase are not necessarily to the same embodiment(s).

Figure 1:
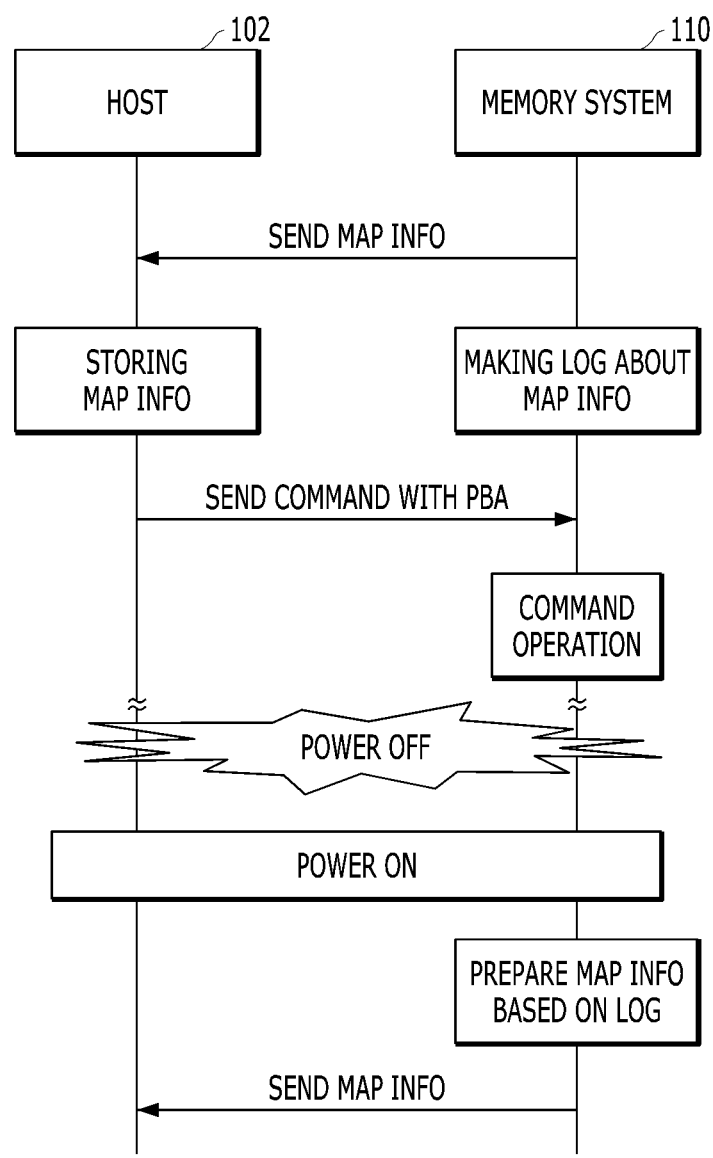
FIG. 1 illustrates a method for sharing map information between a host and a memory system in a data processing system according to an embodiment of the present disclosure.

FIG. 1 illustrates how to share map information between a host and a memory system in a data processing system in accordance with an embodiment of the present disclosure.

Referring to FIG. 1, a host 102 and a memory system 110 may be engaged operatively. The host 102 may include a computing device and may be implemented in a form of a mobile device, a computer, a server, or the like. The memory system 110 operatively engaged with the host 102 may receive a command from the host 102 and store or output data in response to the received command.

The memory system 110 may have a storage space including nonvolatile memory cells. For example, the memory system 110 may be implemented in a form of a flash memory, a solid-state drive (SSD), or the like.

In order to store data in the storage space in response to a request by the host 102, the memory system 110 can perform a mapping operation for associating a file system used by the host 102 with the storage space. This can be referred as to as address translation between a logical address and a physical address. For example, an address identifying data according to the file system used by the host 102 may be called a logical address or a logical block address, and the address indicating a physical location of data in the storage space may be referred to as a physical address or a physical block address. When the host 102 sends a read request with a logical address to the memory system 110, the memory system 110 can search for a physical address corresponding to the logical address and then read and output data stored in a physical location indicated by the physical address. During these processes, the mapping operation or the address translation may be performed while the memory system 110 searches for the physical address corresponding to the logical address inputted from the host 102. The mapping operation or the address translation can be performed based on mapping information such as a mapping table which can associate a logical address with a physical address.

If the host 102 can perform the mapping operation instead of the memory system 110, the time it takes for the memory system 110 to read and output data corresponding to a read request transmitted by the host 102 may be reduced. The host 102 may store and access at least some of map information for performing the mapping operation in order to deliver the read request with the physical address to the memory system 110 through the mapping operation.

Referring to FIG. 1, the memory system 110 may transmit map information (MAP_INFO) to the host 102. The host 102 receiving the map information delivered from the memory system 110 and may store the map information in a memory in the host 102. When the memory system 110 sends all map information to the host 102 and the host 102 can store all such map information in the memory, the memory system 110 may not need to write a log regarding transmitted map information. However, it may be difficult for the host 102 to allocate a storage space in memory for storing all map information generated by the memory system 110. Accordingly, when the host has limited storage space for storing map information, the memory system 110 may select or choose some map information, i.e., map information regarding data or a logical address frequently used or accessed by the host 102, and transmit the selected map information to the host 102.

When the memory system 110 transmits some, but not all, of the map information to the host 102, the memory system 110 may generate a log or a history regarding the transmitted map information. The log or a history may have any of various formats, structures, marks, variables or types, and may be stored in a memory device or a storage area of the memory system 110. According to an embodiment, whenever the memory system 110 transmits map information to the host 102, the log or the history may include data which is relevant to the transmitted map information. Further, the memory system 110 may determine an amount of transmitted map information capable of being recorded in the log or the history as the size of map information to be transmitted to the host 102 at one time. For example, it may be determined that the size of map information that the memory system 110 can transmit to the host 102 is 512 KB. Although the memory system 110 may be able to transmit more than 512 KB of map information to the host 102, the amount of transmitted map information that can be recorded in the log or the history for a single transfer may be limited to 512 KB. The amount of map information that memory system 110 can send to host 102 at one time may be less than the amount of map information that host 102 may store in the memory. For example, the map information may be transmitted to the host 102 in segments, each of a specific size (segment unit). The memory system 110 may transfer several segments of the map information to the host 102 several times, respectively. The segments may be transferred periodically or intermittently.

According to an embodiment, when the memory system 110 transmits more than 1 MB of map information to the host 102, the host 102 can delete old map information, i.e., previously transmitted from the memory system 110 and stored in a memory, according to a timeline. In addition, the map information transmitted from the memory system 110 to the host 102 may include update information. Because a space allocated by the host 102 to store the map information transmitted from the memory system 110 includes volatile memory cells (an overwrite is supported), the host 102 can update map information based on the update information without an additional operation of erasing another map information.

The host 102 may add a physical address PBA into a command transmitted to the memory system 110 based on the map information. In the mapping operation, the host 102 can search for and find the physical address PBA in the map information stored in the memory, based on a logical address corresponding to a command transmitted into the memory system 110. When the physical address exists and is found, the host 102 may transmit the command with the logical address and the physical address into the memory system 110.

The memory system 110, which receives a command with a logical address and a physical address inputted from the host 102, may perform a command operation corresponding to the command. As described above, when the host 102 transfers a physical address corresponding to a read request, the memory system 110 can use the physical address to access and output data stored in a location indicated by the physical address using the corresponding physical address. The memory system 110 can perform an operation in response to the read request without address translation, so that the memory system 110 can reduce a time spent on the operation.

When power is not supplied to the host 102 and the memory system 110, all map information stored in the memory in the host 102 is lost. Power-off or power-on of the host 102 and the memory system 110 may occur according to user's request, or even as a result of an event outside of the user's control. While power is supplied to the host 102 and the memory system 110, the memory system 110 can record a log or a history regarding map information transmitted to the host 102. Thereafter, when power is resumed after power-off, the memory system 110 can transmit map information to the host 102 based on the log or the history so that the host 102 can perform a mapping operation and transmit a command with a logical address and a physical address to the memory system 110. After power is resumed, the host 102 can quickly recover an operation state regarding the mapping operation, which is substantially same to that before the power supply was stopped or not supplied.

Before power is stopped and after power is resumed, needs and usage patterns of users who use a data processing system including the host 102 and the memory system 110 may be similar or different. When a user's needs and usage patterns are not changed, the host 102 may have tried to access or read the same data at a high frequency. When the host 102 performs a mapping operation regarding such data and the memory system 110 can output data more quickly in response to a read request inputted with a logical address and a physical address, it is likely that performance of the data processing system including the host 102 and the memory system 110 would satisfy the user.

Figure 2:
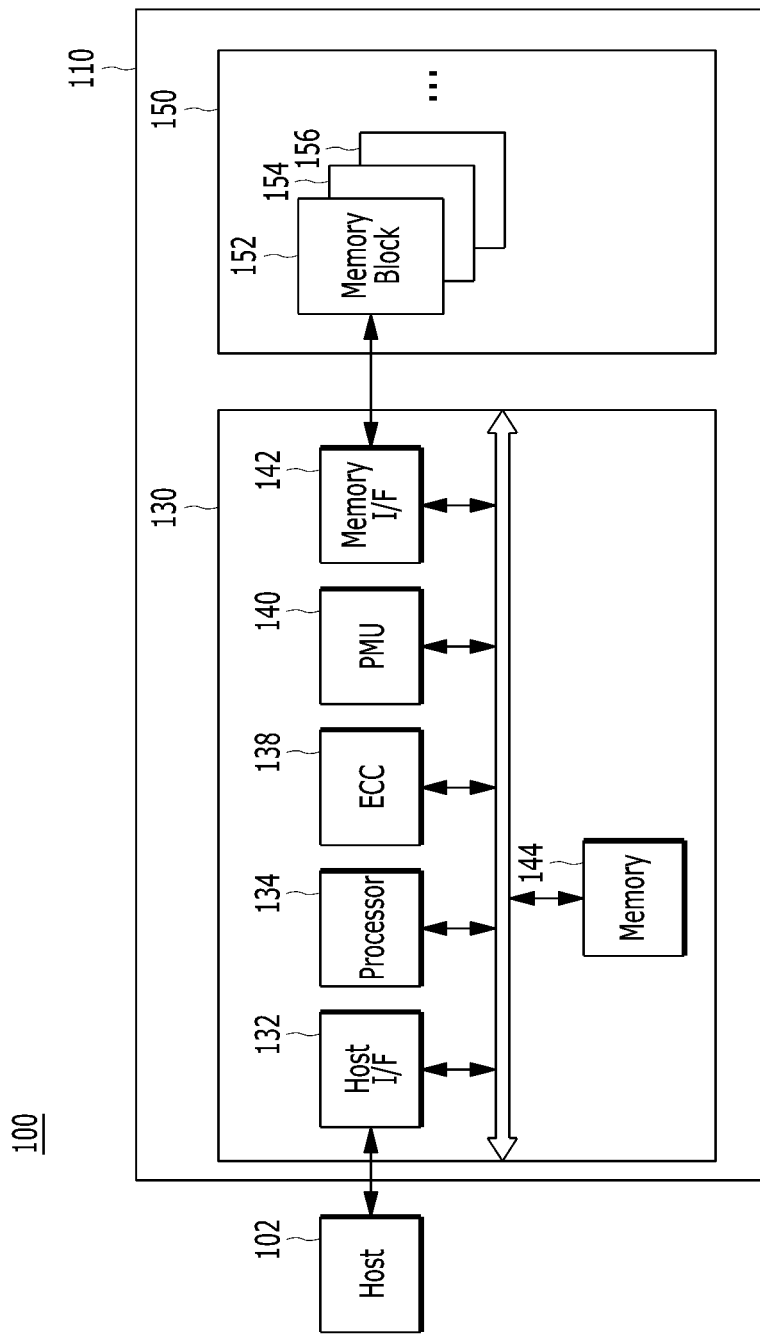
FIG. 2 shows a data processing system including a memory system according to an embodiment of the present disclosure.

Referring to FIG. 2, a data processing system 100 in accordance with an embodiment of the present disclosure is described. Referring to FIG. 2, the data processing system 100 may include a host 102 operably engaged with a memory system 110.

The host 102 may include, for example, a portable electronic device such as a mobile phone, an MP3 player and a laptop computer, or an electronic device such as a desktop computer, a game player, a television (TV), a projector, and the like.

The host 102 also includes at least one operating system (OS), which can generally manage and control functions and operations performed in the host 102. The OS can provide interoperability between the host 102 engaged with the memory system 110 and the user needing and using the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems engaged with the memory system 110, corresponding to a user's request. The host 102 may transmit a plurality of commands corresponding to the user's requests into the memory system 110, thereby performing operations corresponding to commands within the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC) of an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems discussed above.

By way of example but not limitation, the controller 130 and the memory device 150 may be integrated into a single semiconductor device. The controller 130 and memory device 150 may be integrated into an SSD for improving an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC-micro), a SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a subset of the plurality of memory blocks 152, 154, 156. In addition, the memory device 150 may be a non-volatile memory device, for example a flash memory, wherein the flash memory may be embodied in a three-dimensional stack structure.

The controller 130 may control overall operation of the memory device 150, such as read, write, program, and erase operations. For example, the controller 130 may control the memory device 150 in response to a request from the host 102. The controller 130 may provide data, read from the memory device 150, to the host 102. The controller 130 may also store data, provided by the host 102, into the memory device 150.

The controller 130 may include a host interface (I/F) 132, a processor 134, an error correction code (ECC) component 138, a power management unit (PMU) 140, a memory interface (I/F) 142, and memory 144, all operatively coupled via an internal bus.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI), and integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in, and outputted from, the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC component 138 may include any and all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data received by or outputted from the memory device 150 under the control of the processor 134 when the memory device 150 is a flash memory and, in particular, a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 to the host 102. The controller 130 may store data received from the host 102 in the memory device 150. The memory 144 may be used to store data for the controller 130 and the memory device 150 to perform operations such as read operations or program/write operations.

The memory 144 may be implemented as a volatile memory. The memory 144 may be implemented with a static random access memory (SRAM), a dynamic random access memory (DRAM), or both. Although FIG. 2 illustrates, for example, that the second memory 144 is disposed within the controller 130, the invention is not limited thereto. That is, in another embodiment, the memory 144 may be disposed external to the controller 130. For instance, the memory 144 may be embodied by an external volatile memory having a memory interface transferring data and/or signals between the memory 144 and the controller 130.

The memory 144 can store data for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control overall operation of the memory system 110. By way of example but not limitation, the processor 134 can control a program operation or a read operation of the memory device 150 in response to a write request or a read request from the host 102. In accordance with an embodiment, the processor 134 may use or execute firmware to control overall operation of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling, and the like. Particularly, the FTL may load, generate, update, or store map data. Therefore, the controller 130 may map a logical address, which is received from the host 102, with a physical address of the memory device 150 through the map data. The memory device 150 may operate like a general storage device to perform a read or write operation because of the address mapping operation. Also, through the address mapping operation based on the map data, when the controller 130 tries but is unable to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to command received from the host 102. The controller 130 can perform a foreground operation as a command operation, corresponding to a command from the host 102, such as a program operation corresponding to a write command, a read operation corresponding to a read request, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation of copying and storing data stored in a memory block among the memory blocks 152, 154, 156 in the memory device 150 to another memory block, e.g., a garbage collection (GC) operation. The background operation can include an operation of moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands received from the host 102. For example, when performing a plurality of program operations corresponding to a plurality of program commands, a plurality of read operations corresponding to a plurality of read requests, and a plurality of erase operations corresponding to a plurality of erase commands sequentially, randomly, or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command received from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies in the memory device 150. The controller 130 may determine the state of each channel or each way as one of a busy state, a ready state, an active state, an idle state, a normal state, and/or an abnormal state. The controller's determination of which channel or way an instruction (and/or a data) is delivered through can be associated with a physical block address, e.g., to which die(s) the instruction (and/or the data) is delivered. The controller 130 can refer to descriptors delivered from the memory device 150. The descriptors can include a block or page of parameters that describe relevant information about the memory device 150, which is data with a set format or structure. For instance, the descriptors may include device descriptors, configuration descriptors, unit descriptors, and the like. The controller 130 can refer to, or use, the descriptors to determine via which channel(s) or way(s) an instruction or a data is exchanged.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
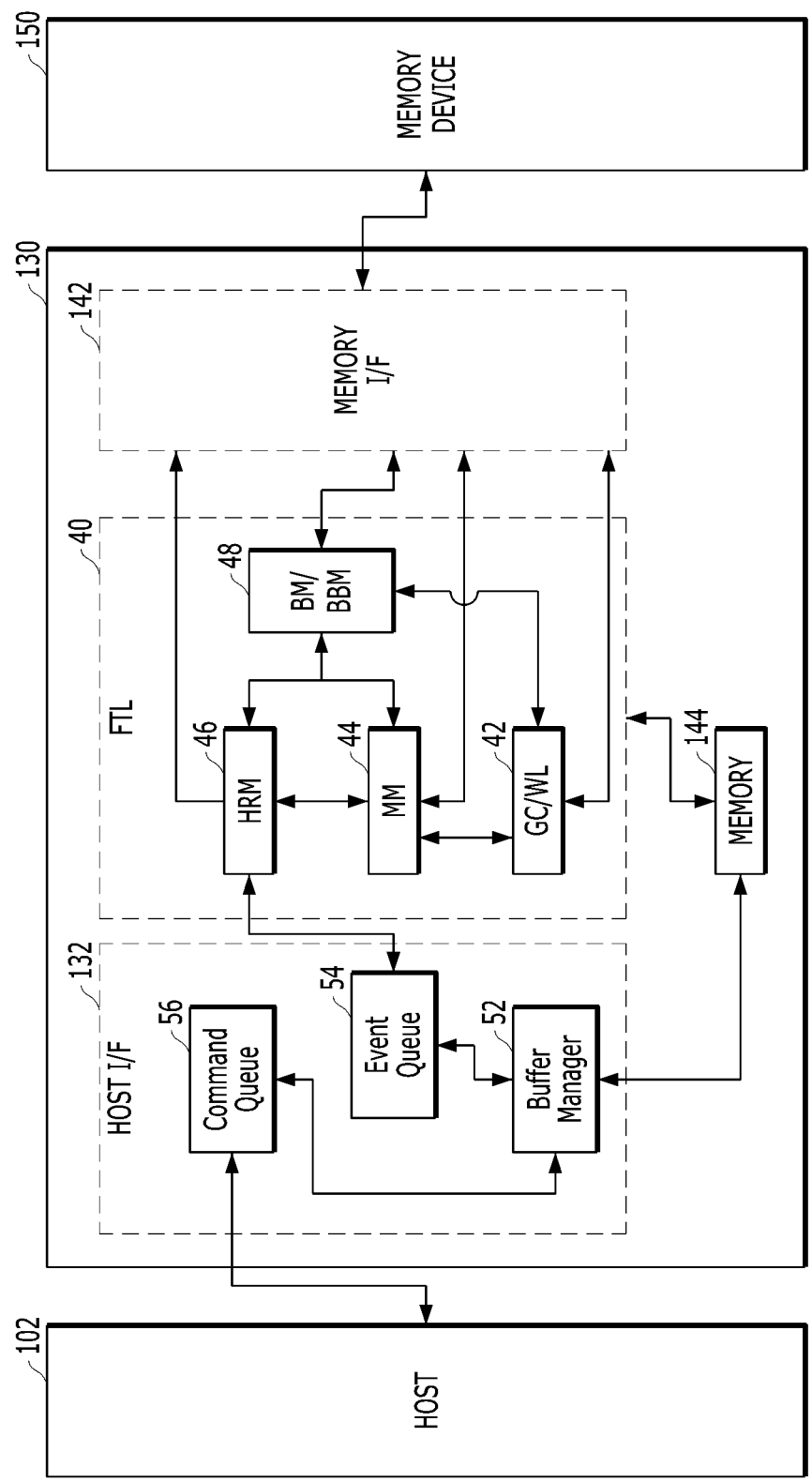
FIG. 3 illustrates a memory system according to an embodiment of the present disclosure.

Referring to FIG. 3, a controller in a memory system in accordance with another embodiment of the present disclosure is described. The controller 130 cooperates with the host 102 and the memory device 150. As illustrated, the controller 130 includes a host interface 132, a flash translation layer (FTL) 40, as well as the host interface 132, the memory interface 142, and the memory 144 previously identified in connection with FIG. 2.

Although not shown in FIG. 3, in accordance with an embodiment, the ECC component 138 described with reference to FIG. 2 may be included in the flash translation layer (FTL) 40. In another embodiment, the ECC component 138 may be implemented as a separate module, a circuit, firmware, or the like, which is included in, or associated with, the controller 130.

The host interface 132 is for handling commands, data, and the like transmitted from the host 102. By way of example but not limitation, the host interface 132 may include a command queue 56, a buffer manager 52, and an event queue 54. The command queue 56 may sequentially store commands, data, and the like received from the host 102 and output them to the buffer manager 52 in an order in which they are stored. The buffer manager 52 may classify, manage, or adjust the commands, the data, and the like, which are received from the command queue 56. The event queue 54 may sequentially transmit events for processing the commands, the data, and the like received from the buffer manager 52.

A plurality of commands or data of the same characteristic, e.g., read or write commands, may be transmitted from the host 102, or commands and data of different characteristics may be transmitted to the memory system 110 after being mixed or jumbled by the host 102. For example, a plurality of commands for reading data (read requests) may be delivered, or commands for reading data (read request) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the characteristics of commands, data, and the like, which have been received from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 40. The event queue 54 receives events, received from the buffer manager 52, which are to be internally executed and processed by the memory system 110 or the controller 130 in response to the commands, the data, and the like transmitted from the host 102, so as to deliver the events into the flash translation layer (FTL) 40 in the order received.

Figure 6A:
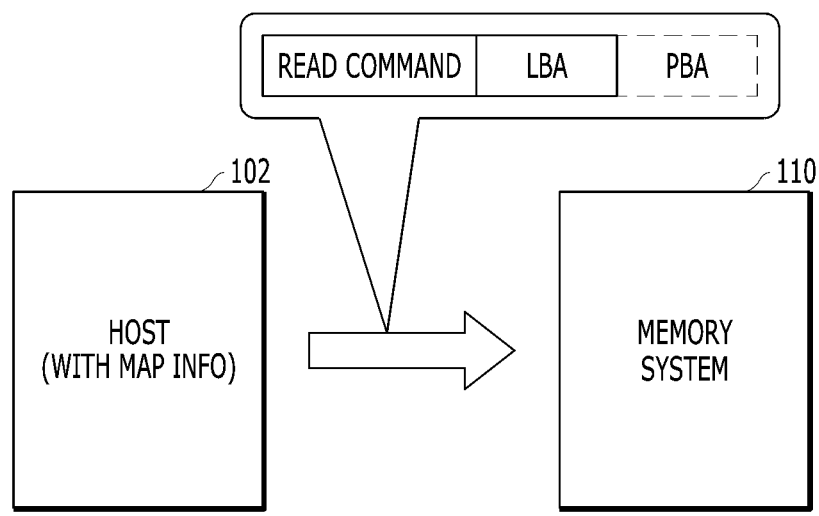
FIGS. 6A and 6B illustrate examples of a transaction between a host and a memory system in a data processing system according to an embodiment of the present disclosure.
Figure 9:
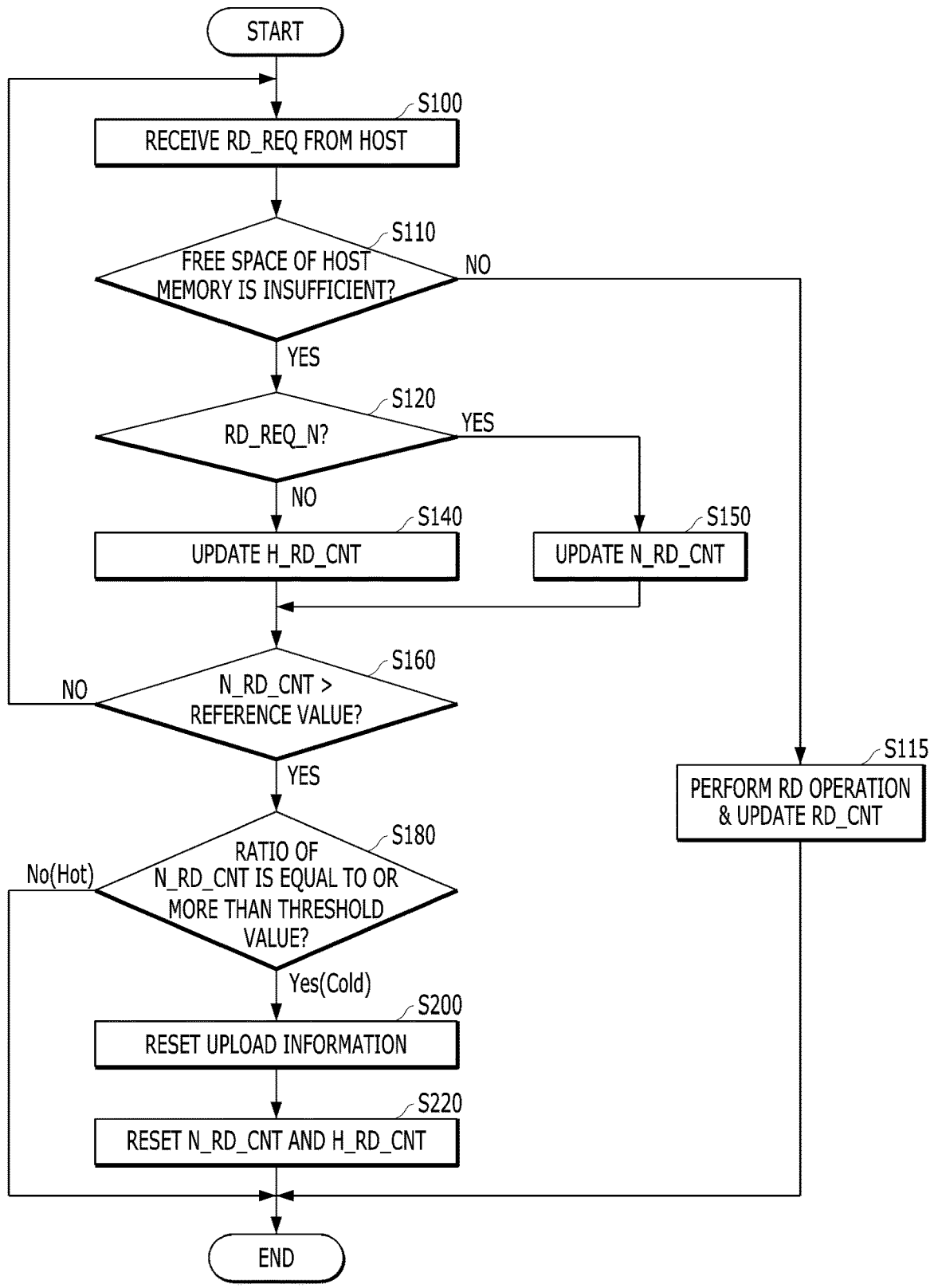
FIG. 9 is a flowchart illustrating an operation in which the memory system manages a host memory during an operation, such as that described with reference to FIG. 8.

In accordance with an embodiment, the host interface 132 described with reference to FIG. 3 may perform some functions of the controller 130 described with reference to FIGS. 1 and 2. The host interface 132 may set the host memory 106 in the host 102, which is shown in FIG. 6A or 9, as a slave and add the host memory 106 as an additional storage space which is controllable or usable by the controller 130.

In accordance with an embodiment, the flash translation layer (FTL) 40 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry to the map data manager (MM) 44 to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (no data) in the memory device 150, and then, can transmit a map update request corresponding to the program request to the map manager (MM) 44 to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant portion of the mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which valid page(s) have not completely copied, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address.

In accordance with an embodiment, at least one of the state manager 42, the map manager 44, or the block manager 48 can include circuitry for performing its own operation. As used in the present disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

The memory device 150 can include a plurality of memory blocks. The plurality of memory blocks can be any of different types of memory blocks such as single-level cell (SLC) memory blocks, multi-level cell (MLC) memory blocks, or the like, according to the number of bits that can be stored or represented in one memory cell. Here, the SLC memory block includes a plurality of pages implemented by memory cells each storing one bit of data. The SLC memory block can have high data I/O operation performance and high durability. The MLC memory block includes a plurality of pages implemented by memory cells each storing multi-bit data (e.g., two bits or more). The MLC memory block can have larger storage capacity for the same space compared to the SLC memory block. The MLC memory block can be highly integrated in view of storage capacity. In an embodiment, the memory device 150 may be implemented with MLC memory blocks, such as double level memory blocks, triple-level cell (TLC) memory blocks, quadruple-level cell (QLC) memory blocks, or a combination thereof. The double level memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In another embodiment, the memory device 150 can be implemented with blocks, each including a plurality of pages implemented by memory cells, each capable of storing five or more bits of data.

In an embodiment of the present disclosure, the memory device 150 is embodied as nonvolatile memory such as a flash memory such as a NAND flash memory, a NOR flash memory, or the like. Alternatively, the memory device 150 may be implemented by at least one of a phase change random access memory (PCRAM), a ferroelectrics random access memory (FRAM), a spin injection magnetic memory (SU-RAM), a spin transfer torque magnetic random access memory (STT-MRAM), or the like.

Figure 4:
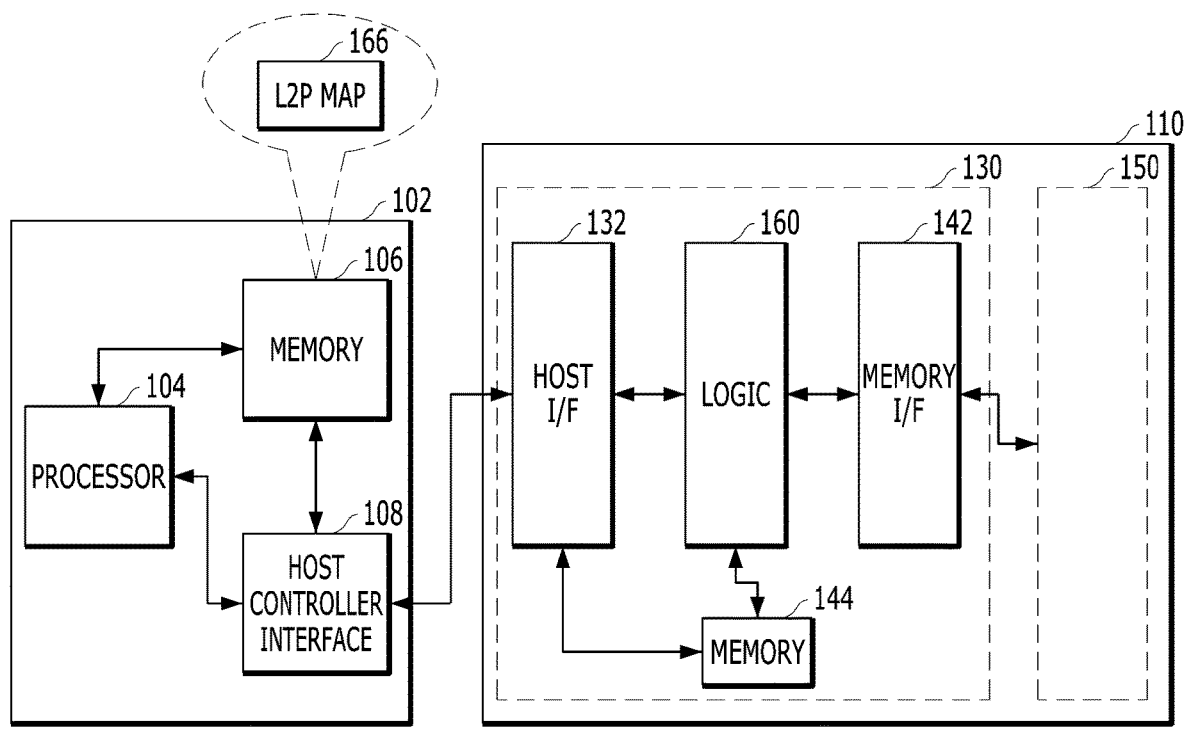
FIG. 4 illustrates configuration of a host and a memory system in a data processing system according to an embodiment of the present disclosure.
Figure 5:
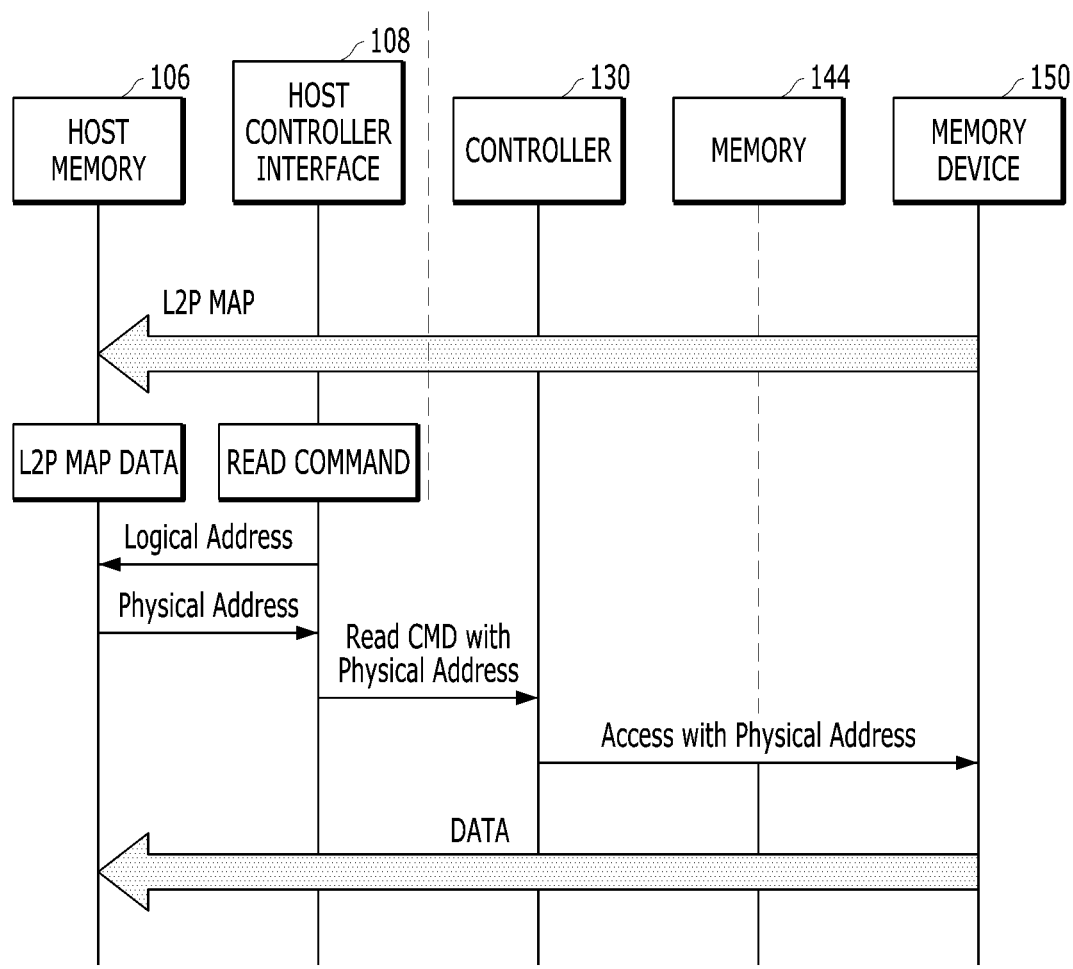
FIG. 5 illustrates a read operation of a host and a memory system in a data processing system according to an embodiment of the present disclosure.

FIGS. 4 and 5 illustrate a configuration in which a portion of memory in a host is available for use as a cache device for storing metadata used in the memory system.

Referring to FIG. 4, the host 102 may include a processor 104, memory 106, and a host controller interface 108. The memory system 110 may include a controller 130 and a memory device 150. Herein, the controller 130 and the memory device 150 described with reference to FIG. 4 may correspond to the previously-described controller 130 and memory device 150, respectively.

Accordingly, the controller 130 and the memory device 150 shown in FIG. 4 are described below primarily in terms of their respective technical differences with respect to the controller 130 and the memory device 150 shown in FIGS. 1 to 3. Particularly, a logic block 160 in the controller 130 may correspond to the flash translation layer (FTL) 40 of FIG. 3. However, according to an embodiment, the logic block 160 in the controller 130 may perform an additional function as compared to the flash translation layer (FTL) 40 of FIG. 3.

The host 102 may include the processor 104, which has a higher performance than that of the memory system 110, and the host memory 106 which is capable of storing a larger amount of data than that of the memory system 110 and which cooperates with the host 102. The processor 104 and the host memory 106 in the host 102 can have an advantage over their respective counterparts in the memory system 110 in terms of space and upgradability. For example, the processor 104 and the host memory 106 can have less of a space limitation than the processor 134 and the memory 144 in the memory system 110. The processor 104 and the host memory 106 can be replaceable for upgrading their performance, which is distinguishable from the processor 134 and the memory 144 in the memory system 110. In an embodiment, the memory system 110 can utilize the resources possessed by the host 102 in order to increase the operation efficiency of the memory system 110.

As an amount of data which can be stored in the memory system 110 increases, an amount of associated metadata stored in the memory system 110 also increases. When storage capability used to load the metadata in the memory 144 of the controller 130 is limited or restricted, the increase in an amount of loaded metadata may cause an operational burden on operations of the controller 130. For example, because of limitation of space or region allocated for metadata in the memory 144 of the controller 130, some, but not all, of the metadata may be loaded. If the loaded metadata does not include specific metadata for a physical location to which the host 102 intends to access, the controller 130 stores the loaded metadata back in the memory device 150 if some of the loaded metadata has been updated, as well as load the specific metadata for the physical location to which the host 102 intends to access. These operations should be performed for the controller 130 to perform a read operation or a write operation instructed by the host 102, and may degrade performance of the memory system 110.

Storage capability of the host memory 106 in the host 102 may be tens or hundreds of times larger than that of the memory 144 in the controller 130. The memory system 110 may transfer metadata 166 used by the controller 130 to the host memory 106 in the host 102 so that at least a portion of the host memory 106 in the host 102 may be accessed by the memory system 110. The accessible portion of the host memory 106 can be used as a cache memory for address translation for reading or writing data in the memory system 110. In this case, the host 102 translates a logical address into a physical address based on the metadata 166 stored in the host memory 106 before transmitting the logical address along with a request, a command, or an instruction to the memory system 110. Then, the host 102 can transmit the translated physical address with the request, the command, or the instruction to the memory system 110. The memory system 110, which receives the translated physical address with the request, the command, or the instruction, may skip an internal process of translating the logical address into the physical address and access the memory device 150 based on the physical address transferred. In this case, overhead (e.g., operational burden) of the controller 130 loading metadata from the memory device 150 for the address translation may be reduced or eliminated, and operational efficiency of the memory system 110 can be enhanced.

On the other hand, even if the memory system 110 transmits the metadata 166 to the host 102, the memory system 110 can control mapping information that is a reference of the metadata 166 such as metadata generation, erase, update, and the like. The metadata 166 uploaded to the host 102 may be at least some of the metadata stored in the memory device 150. The mapping information stored in the memory system 110 may be updated as a result of an operation of the memory device 150. In an embodiment, the metadata 166 may be updated due to update of the metadata stored in the memory device 150. The controller 130 in the memory system 110 may perform a background operation such as garbage collection and wear leveling according to an operation state of the memory device 150 and may determine a physical address, i.e., which physical location in the memory device 150 data transferred from the host 102 is to be stored. Because a physical address of data stored in the memory device 150 may be changed and the host 102 has not recognized the changed physical address, the memory system 110 may, on its own initiative, control the metadata 166 based on the metadata stored in the memory system 110.

While the memory system 110 controls metadata used for the address translation, it can be determined that the memory system 110 needs to modify or update the metadata 166 previously transmitted to the host 102. The memory system 110 can send a signal or metadata to the host 102 so as to request the update of the metadata 166 stored in the host 102. The host 102 may update the stored metadata 166 in the host memory 106 in response to a request delivered from the memory system 110. This allows the metadata 166 stored in the host memory 106 in the host 102 to be kept as the latest version such that, even though the host controller interface 108 uses the metadata 166 stored in the host memory 106, there is no problem in translating a logical address into a physical address and transmitting the translated physical address along with the logical address to the memory system 110.

The metadata 166 stored in the host memory 106 may include mapping information used for translating a logical address into a physical address. Referring to FIG. 4, metadata associating a logical address with a physical address may include two distinct items: first mapping information used for translating a logical address into a physical address; and second mapping information used for translating a physical address into a logical address. Among them, the metadata 166 stored in the host memory 106 may include the first mapping information. The second mapping information can be primarily used for internal operations of the memory system 110, but might not be used for operations requested by the host 102 to store data in the memory system 110 or read data corresponding to a particular logical address from the memory system 110. Depending on an embodiment, the second mapping information might not be transmitted by the memory system 110 to the host 102.

The controller 130 in the memory system 110 can control (e.g., create, delete, update, etc.) the first mapping information or the second mapping information, and store either in the memory device 150. Because the host memory 106 in the host 102 is a type of volatile memory, the metadata 166 stored in the host memory 106 may disappear when an event such as interruption of power supply to the host 102 and the memory system 110 occurs. Accordingly, the controller 130 in the memory system 110 might not only keep the latest state of the metadata 166 stored in the host memory 106 of the host 102, but also store the latest state of the first mapping information or the second mapping information in the memory device 150.

Referring to FIGS. 4 and 5, an operation requested by the host 102 to read data stored in the memory system 110 is described when the metadata 166 is stored in the host memory 106 of the host 102.

Power is supplied to the host 102 and the memory system 110, and then the host 102 and the memory system 110 operably engage. When the host 102 and the memory system 110 cooperate, the metadata (L2P MAP) stored in the memory device 150 can be transferred to the host memory 106.

When a read request (Read REQ) is issued by the processor 104 in the host 102, the read request is transmitted to the host controller interface 108. After receiving the read request, the host controller interface 108 searches for a physical address corresponding to a logical address corresponding to the read request in the metadata (L2P MAP) stored in the host memory 106. Based on the metadata (L2P MAP) stored in the host memory 106, the host controller interface 108 can recognize the physical address corresponding to the logical address. The host controller interface 108 carries out an address translation for the logical address associated with the read request.

The host controller interface 108 transfers the read request (Read REQ) with the logical address as well as the physical address to the controller 130 of the memory system 110. The controller 130 can access the memory device 150 based on the physical address received with the read request. Data stored at a location corresponding to the physical address in the memory device 150 can be transferred to the host memory 106 in response to the read request (Read REQ).

An operation of reading data stored in the memory device 150 including a nonvolatile memory may take more time than an operation of reading data stored in the host memory 106 or the like which is a volatile memory. In the above-described operation for handling the read request (Read REQ), the controller 130 may skip or omit an address translation corresponding to the logical address received from the host 102 (e.g., searching for and recognizing a physical address associated with the logical address). For example, in the address translation, the controller 130 might not have to load metadata from the memory device 150 or replace the metadata stored in the memory 144 when the controller 130 cannot find metadata for the address translation in the memory 144. This allows the memory system 110 to perform a read operation requested by the host 102 more quickly.

FIG. 6A illustrates a first example of a transaction between a host 102 and a memory system 110 in a data processing system according to an embodiment of the present disclosure.

Referring to FIG. 6A, the host 102 storing the map information (MAP INFO) may transmit a read request including a logical address LBA and a physical address PBA to the memory system 110. When a physical address PBA corresponding to a logical address LBA transmitted with a read request (READ REQ) to the memory system 110 is found in the map information stored in the host 102, the host 102 can transmit the read request (READ REQ) with the logical address LBA and the physical address PBA to the memory system 110. However, when the physical address PBA corresponding to the logical address LBA transmitted with the read request (READ REQ) is not found in the map information stored by the host 102, the host 102 may transmit the read request (READ REQ) including only the logical address LBA without the physical address PBA to the memory system 110.

Although FIG. 6A describes an operation in response to the read request (READ REQ) as an example, an embodiment of the present disclosure may be applied to a write command or an erase command which the host 102 may transfer to the memory system 110.

Figure 6B:
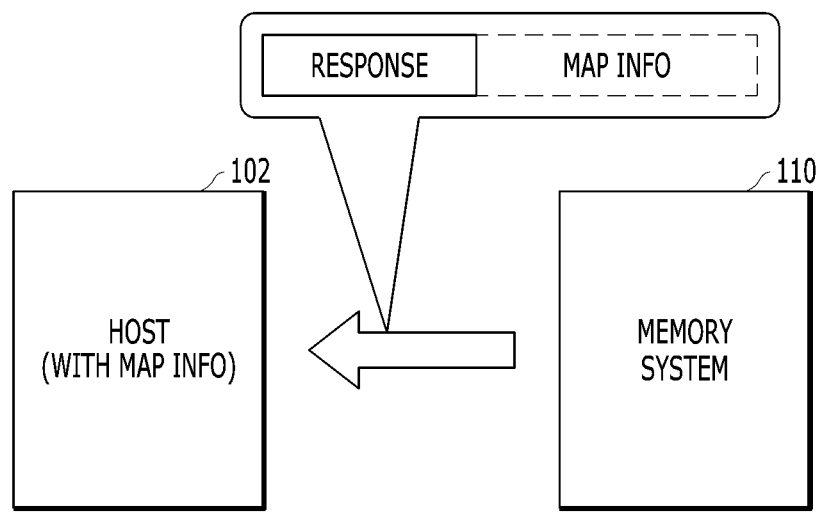

FIG. 6B illustrates a second example of a transaction between a host and a memory system in a data processing system according to an embodiment of the present disclosure.

Referring to FIG. 6B, the memory system 110 may transfer map information (MAP INFO) to the host 102. The memory system 110 may use a response (RESPONSE) to a command of the host 102 to transfer the map information (MAP INFO). Herein, the response is a kind of message or packet which is transmitted after the memory system completely performs an operation in response to the command from the host 102.

More generally, the response for transmitting map information may take any suitable form. For example, the memory system 110 may transmit the map information to the host 102 by using a response corresponding to a read request, a write command, or an erase command.

The memory system 110 and the host 102 may exchange a command or a response with each other in a specific format set according to the communication protocol used. For example, a format of the response may include a basic header, a result or a state according to success or failure of the command received from the host 102, and additional information indicating an operational state of the memory system 110. The memory system 110 may add or insert map information into the format of the response to transmit the map information to the host 102.

Figure 7A:
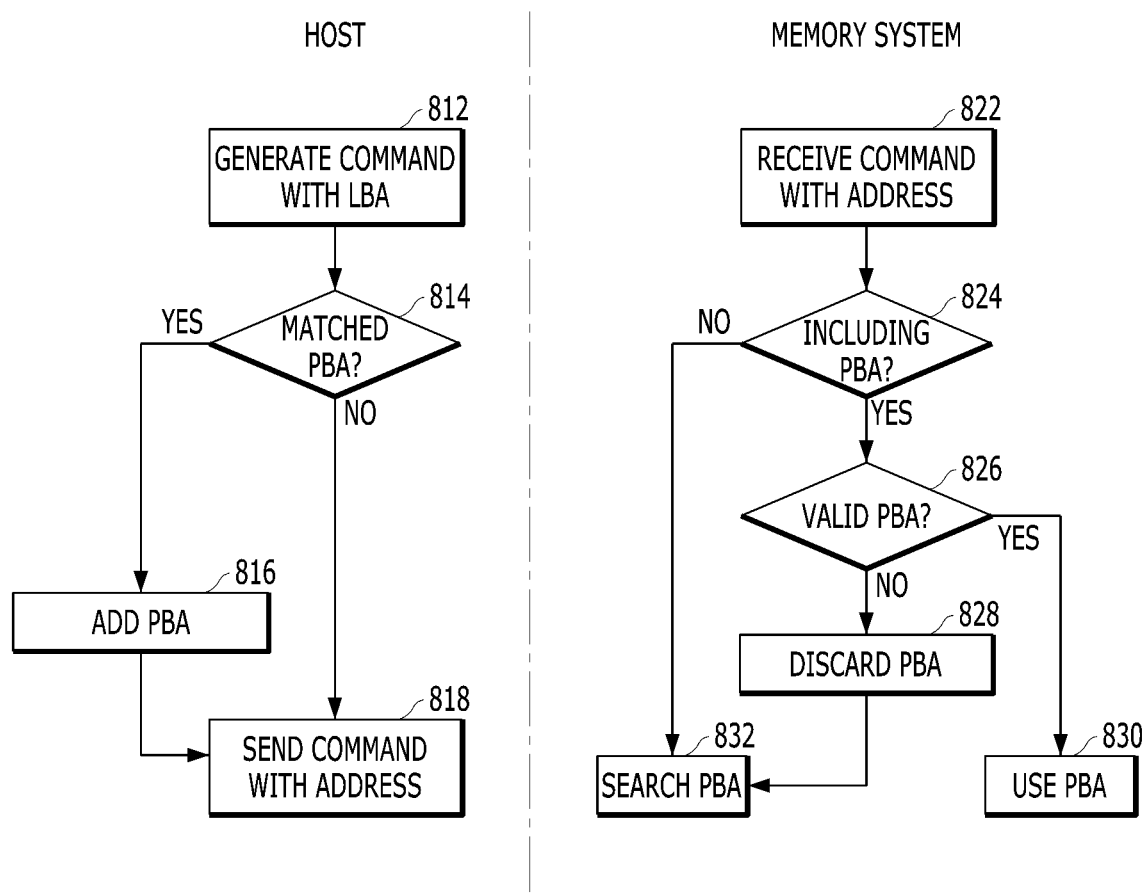
FIGS. 7A to 7D are flowcharts illustrating operations of a host and a memory system according to an embodiment of the present disclosure.

FIG. 7A illustrates a first operation of a host and a memory system according to an embodiment of the present disclosure. Specifically, FIG. 7A illustrates detailed operations performed by a host, e.g., host 102 of FIG. 6A, to transfer a command including a logical address LBA and a physical address PBA to a memory system, e.g., memory system 110 of FIG. 6A, which receives the command.

Referring to FIG. 7A, the host may generate a command (COMMAND) including a logical address LBA in 812. Then, the host may check whether a physical address PBA corresponding to the logical address LBA is included in map information, in 814. When no physical address PBA is included in the map information (NO in 814), the host may send the command including the logical address LBA in 818.

When the physical address PBA is included in the map information (YES in 814), the host may add the physical address PBA to the command including the logical address LBA in 816. The host may send the command including the logical address LBA and the physical address PBA in 818.

The memory system may receive a command transferred from an external component, e.g., the host, in 822. The memory system may check whether the physical address PBA is included in the received command in 814. When no physical address PBA is included in the received command (NO in 824), the memory system may search for a physical address corresponding to the logical address included in the received command in 832.

When the physical address PBA is included in the received command (YES in 824), the memory system may check whether the physical address PBA is valid, in 826. The memory system may transfer the map information to the host, and the host may include the physical address PBA in the command by performing mapping based on the map information transferred by the memory system, and transfer the command with the physical address PBA. However, after the memory system transfers the map information to the host, the map information managed by the memory system may be changed and updated. When the map information is in a dirty state, the physical address PBA transferred by the host cannot be used as it is. Therefore, the memory system may determine whether the physical address PBA included in the received command is valid. When the physical address PBA included in the received command is valid (YES in 826), the memory system may perform an operation corresponding to the command using the physical address PBA, in 830.

When the physical address PBA included in the received command is not valid (NO in 826), the memory system may discard the physical address PBA included in the received command, in 828. In this case, the memory system may search for a physical address PBA based on the logical address LBA included in the received command in 832.

Figure 7B:
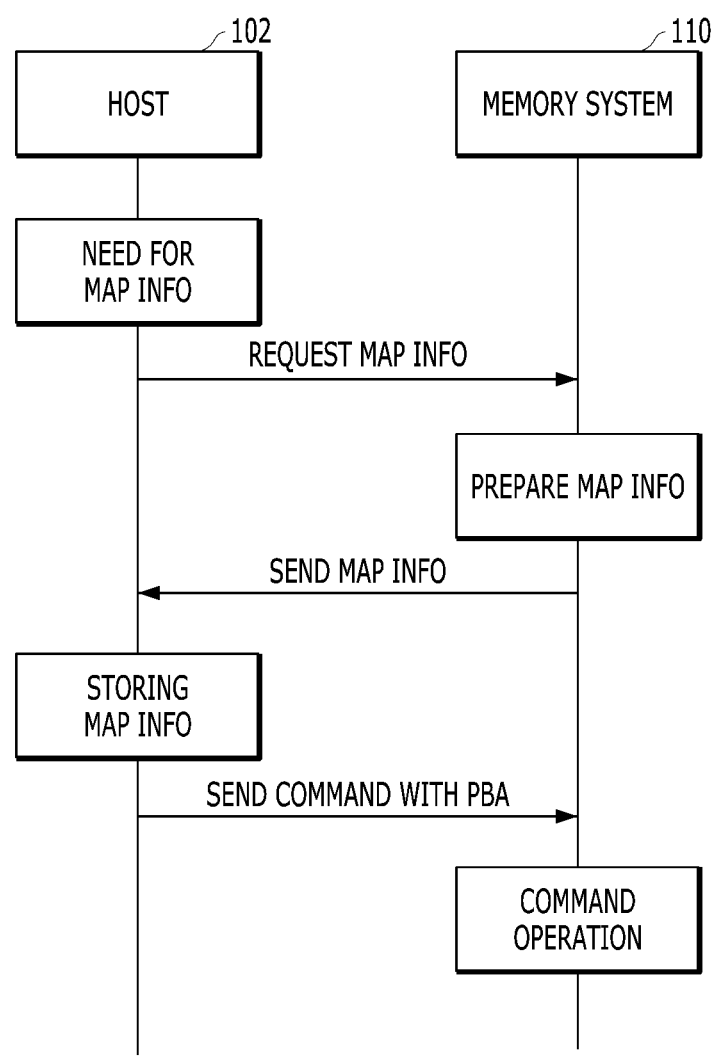

FIG. 7B illustrates a second operation of the host and the memory system in accordance with an embodiment. Specifically, FIG. 7B illustrates a process in which the host 102 requests map information from the memory system 110, and the memory system 110 sends the map information in response to the request of the host 102, in a host control mode.

Referring to FIG. 7B, the host 102 may need or be able to accommodate map information. For example, when the host 102 can allocate a space capable of storing map information therein or expects the memory system 110 to input/output data at higher speed in response to a command, the host 102 may receive map information. Furthermore, the host 102 may need map information even according to a user's request.

The host 102 may request the map information from the memory system 110, and the memory system 110 may prepare the map information in response to the request of the host 102. For example, the host 102 may send a read buffer command to the memory system 110, in order to request the map information.

According to an embodiment, the host 102 may request specific map information from the memory system 110. According to another embodiment, the host 102 may only request map information from the memory system 110, and the memory system 110 may decide which map information to provide.

The memory system 110 may transfer the prepared map information to the host 102. The host 102 may store the map information transferred from the memory system 110 in an internal storage space thereof (for example, the host memory 106 described with reference to FIGS. 4 and 5).

The host 102 may include the physical address PBA in the command to be sent to the memory system 110, using the map information stored therein, and transfer the command COMMAND with the physical address PBA. The memory system 110 may perform the corresponding operation using the physical address PBA included in the command.

Figure 7C:
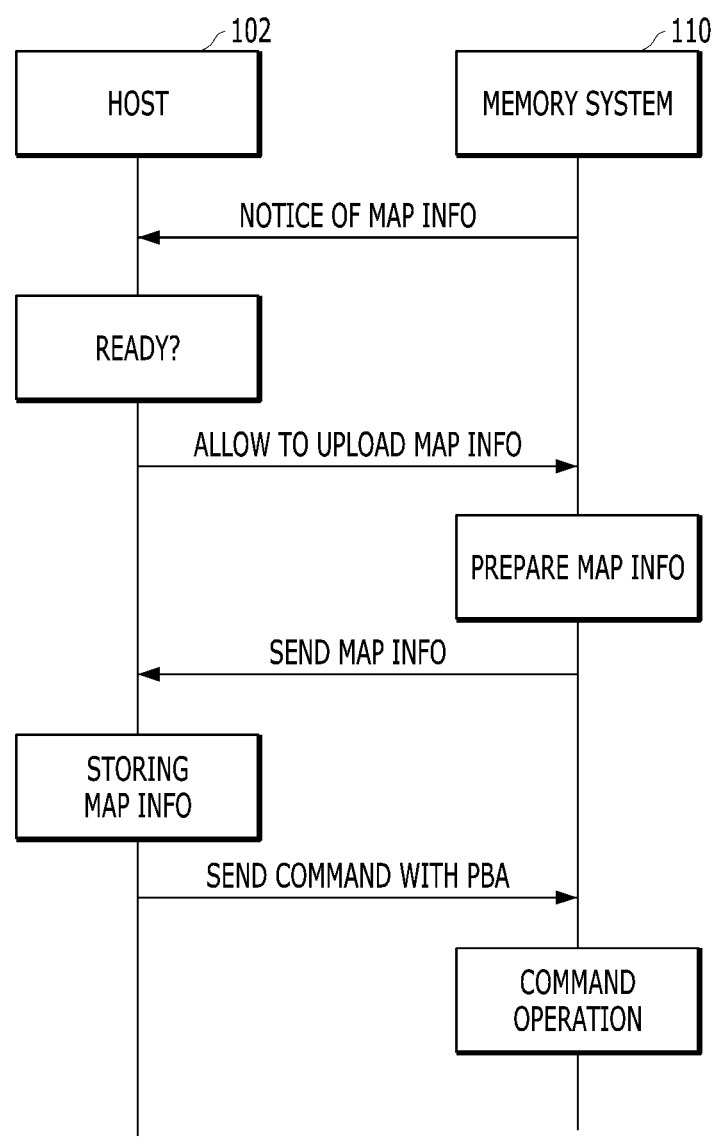

FIG. 7C illustrates a third operation of the host and the memory system in accordance with an embodiment. Specifically, FIG. 7C illustrates a process in which the memory system 110 requests the host 102 to read map information, and the host 102 receives the map information in response to the request of the memory system 110, in a device control mode.

Referring to FIG. 7C, the memory system 110 may notify the host 102 that the memory system 110 will send the map information to the host 102, or request that the host 102 send a read request for the map information to the memory system 110. The host 102 may check whether the map information can be stored therein, in response to the notice related to the map information sent from the memory system 110. When the host 102 can receive the map information sent from the memory system 110, the host 102 may allow the memory system 110 to send the map information. For example, the host 102 may send a read buffer command to the memory system 110, in order to allow the memory system 110 to send the map information.

The memory system 110 may prepare the map information to be sent to the host 102, and then send the map information to the host 102.

Then, the host 102 may store the received map information in the internal storage space (for example, the host memory 106 described with reference to FIG. 4). The host 102 may perform mapping based on the stored map information, and then include the physical address PBA in a command to be sent to the memory system 110.

The memory system 110 may check whether the physical address PBA is included in the command transferred from the host 102, and perform an operation corresponding to the command using the physical address PBA.

In relation to the sending of the map information, while the host 102 may play a leading role in the operation of the host 102 and the memory system 110, described with reference to FIG. 7B, the memory system 110 may play a leading role in the operation of the host 102 and the memory system 110, described with reference to FIG. 7C. According to an embodiment, the memory system 110 and the host 102 may selectively use the methods for sending map information, described with reference to FIGS. 7B and 7C, depending on an operation environment.

Figure 7D:
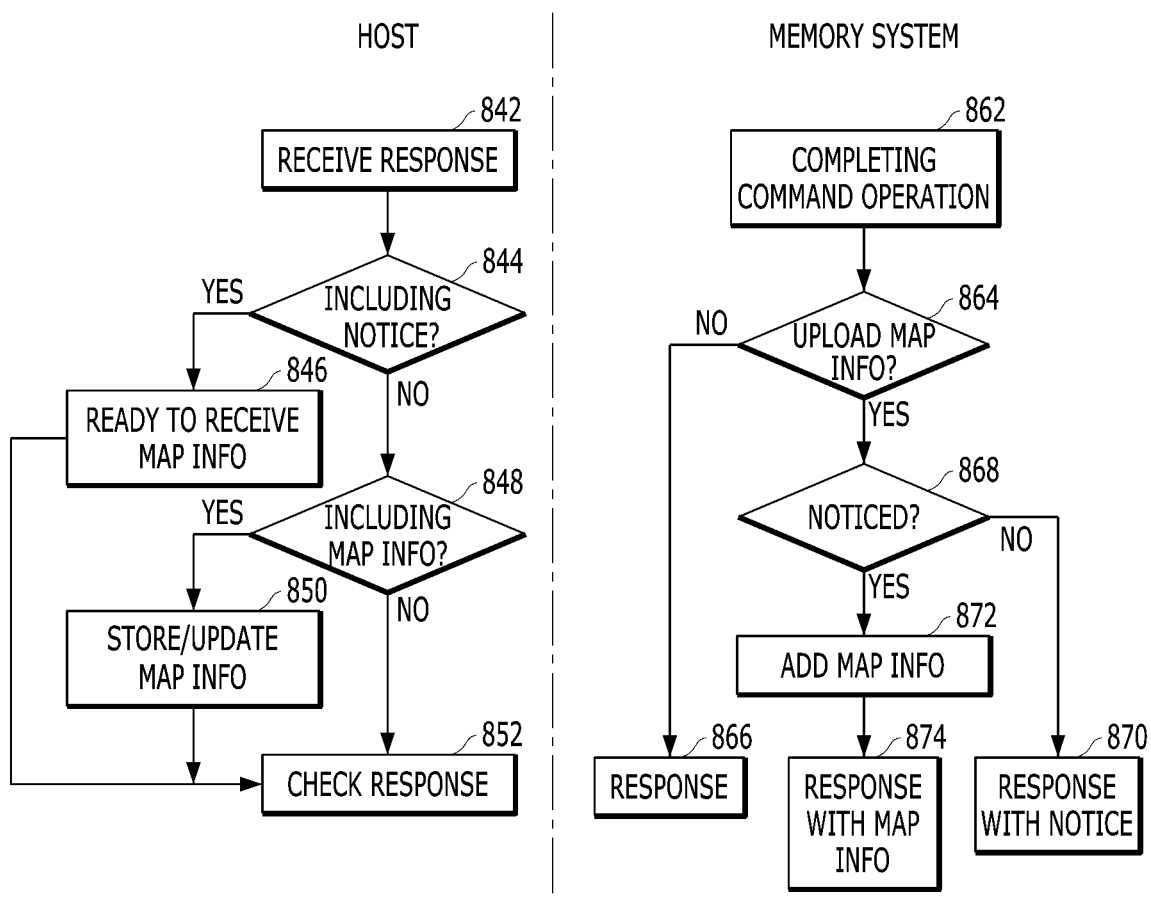

FIG. 7D illustrates a fourth operation of the host and the memory system in accordance with an embodiment. Specifically, FIG. 7D illustrates the case in which the memory system intends to send map information to the host, while the host and the memory system are interconnected.

Referring to FIG. 7D, the memory system may check whether an operation corresponding to the command transferred from the host has been completed, in 862. The memory system may send a response (RESPONSE) including information on whether the operation corresponding to the command transferred from the host has been completed (succeeded or failed), after the operation corresponding to the command has been completed.

According to an embodiment, the response may further include the notice and/or request described with reference to FIGS. 7B and 7C. According to an embodiment, the response may include map information which the memory system will send to the host. For this operation, after the operation corresponding to the command has been completed, the memory system may check whether there is map information to send to the host, before transmitting the response corresponding to the command, in 864. When there is no map information to be sent to the host (NO in 864), the memory system may send the response including information on whether the operation corresponding to the command transferred from the host has been completed, in 866.

When the memory system has map information to be sent to the host (YES in 864), the memory system may check whether it has notified the host that the memory system would send map information, in 868. The notice (NOTICE) may be similar to that described with reference to FIG. 7C. When no such advance notice has been given to the host (NO in 868), even though the memory system intends to send the map information, the memory system may add notice to the response, and transfer the response to the host in 870.

When the host has been notified that the memory system would send the map information to the host (YES in 868), the memory system may add the map information to the response in 872. Then, the memory system may send the response including map information in 874.

The host may receive one or more of the response sent from the memory system, the response with notice (RESPONSE WITH NOTICE), and the response with map information (RESPONSE WITH MAP INFO) in 842.

The host may check whether the notice is included in the received response, in 844. When the notice is included in the received response (YES in 844), the host may be ready to receive and store map information, which may be subsequently transferred, in 846. Then, the host may check a response corresponding to a previous command in 852. For example, the host may check the response to confirm whether the previous command has succeeded or failed.

When no notice is included in the received response (NO in 844), the host may check whether map information is included in the response, in 848. When no map information is included in the response (NO in 848), the host may check the response corresponding to the previous command in 852.

When the map information is included in the received response (YES in 848), the host may store the map information, included in the response, in the internal storage space thereof, or update the stored map information, in 850. Then, the host may check the response corresponding to the previous command in 852.

Furthermore, the host 102 may send a read buffer command to the memory system 110, in order to read the map information from the memory system.

Figure 8:
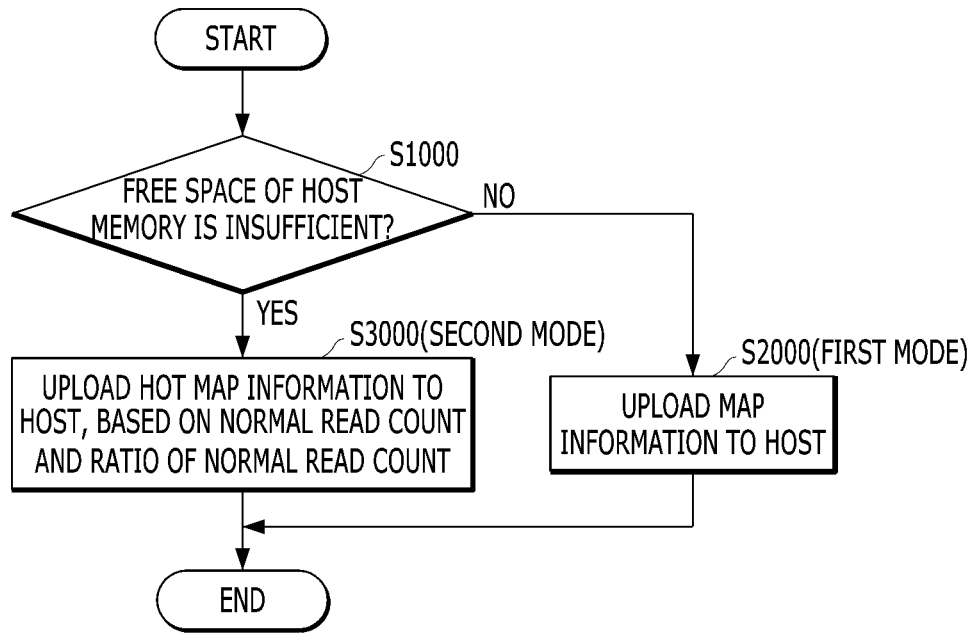
FIG. 8 is a flowchart illustrating an operation in which a memory system, in accordance with an embodiment, manages a host memory.

FIG. 8 is a flowchart illustrating a method in which the memory system in accordance with an embodiment manages the storage area of the host.

The memory system (110 of FIGS. 4 and 5) in accordance with an embodiment may include the nonvolatile memory device (150 of FIGS. 4 and 5) which stores user data and metadata of the user data, and the controller (130 of FIGS. 4 and 5) which uploads at least some of the metadata to the host (102 of FIGS. 4 and 5).

After uploading the metadata to the host, the memory system in accordance with an embodiment determines whether there is insufficient free space, i.e., space having no data stored therein, in the host memory (106 of FIGS. 4 and 5), in operation S1000. The host memory may check what space, if any, is allocated to store the metadata, among the storage spaces of the host. The metadata may be map information in which a physical address of the memory device is matched with a logical address used by the host.

In an embodiment, the case in which the host memory has sufficient free space is referred to as a first mode, and the case in which the host memory has insufficient free space is referred to as a second mode.

According to an embodiment, the memory system may compare the size of free space in the host memory to a set value, in order to determine whether the host memory is in the first or second mode. That is, when the size of the free space is larger than the set value, the memory system may determine that the host memory is in the first mode. On the contrary, when the size of the free space is smaller than the set value, the memory system may determine that the host memory is in the second mode. The set value may be a specific storage size or a specific ratio of free space to the entire space of the host memory. According to an embodiment, the set value may be set to determine whether or not the host memory is full. When the host memory is full, the set value may indicate that the host memory has no free space, and when the host memory is not full, the set value may indicate that the host memory has free space. Thus, the set value may be equal to or more than '0'.

When the free space of the host memory is sufficient (NO in S1000), the memory system may upload map information of user data, corresponding to a read request from the host, to the host, in operation S2000 (first mode).

When the free space of the host memory is insufficient (YES in S1000), the memory system may upload hot map information to the host, based on a normal read count N_RD_CNT and the ratio of the normal read count N_RD_CNT to the total read count (described below) in operation S3000 (second mode).

For this operation, the memory system may manage a read count RD_CNT indicating the number of times that a read request is made by the host. The read count RD_CNT may be the sum of the normal read count N_RD_CNT and a Host-aware Performance Booster (HPB) read count H_RD_CNT. Which of these two types of read request RD_REQ is received may be determined based on a characteristic of the read request itself.

The normal read count N_RD_CNT indicates the number of times that a normal read request N_RD_REQ including only a logical address without a physical address is received. The HPB read count H_RD_CNT indicates the number of times that a HPB read request H_RD_REQ including a logical address and a physical address corresponding to the logical address is received. The hot map information indicates map information for which the read count RD_CNT is relatively high, and the cold map information indicates map information for which the read count RD_CNT is relatively low.

Furthermore, the ratio of the normal read count N_RD_CNT in an embodiment indicates the ratio of the normal read count N_RD_CNT to the total read count which represents the sum of N_RD_CNT and H_RD_CNT after it is determined that the free space of the host memory is insufficient. In particular, in the following description, the case in which the ratio of the normal read count N_RD_CNT to the total read count is equal to or more than a threshold value and the case in which the ratio of the HPB read count H_RD_CNT to the total read count is less than the threshold value are determined to be the same case.

That is, when the number of received normal read requests is equal to or more than a reference value and the ratio of the received normal read requests to all read requests is equal to or more than the threshold value while the free space of the host memory is insufficient, the memory system described with reference to FIG. 8 determines that the current map information stored in the host is cold map information, and uploads hot map information to the host to replace the cold map information.

Thus, since a read request received after hot map information replaces cold map information in the host is highly likely to be a HPB read request H_RD_REQ, the memory system may perform a read operation without performing an L2P translation operation.

FIG. 9 illustrates a method in which the memory system manages the storage area of the host in the second mode.

When a read request RD_REQ is received from the host in operation S100, the memory system determines whether the free space of the host memory is insufficient, in operation S110.

The memory system may determine whether the free space of the host memory is insufficient, based on the storage space of the host memory and upload information. The upload information of each entry of map information (i.e., metadata or map data) may indicate the corresponding entry of map information has been uploaded to the host. The upload information is described in more detail with reference to FIGS. 11A to 11E. For example, when the size of the storage space of the host memory is capable of storing 5 pieces of map information, the number of pieces of map information uploaded to the host based on the upload information is four, and the set value corresponds to the size of one piece of map information, the size of the free space is equal to or less than the set value. Thus, the memory system may determine that the free space of the host memory is sufficient.

When the free space of the host memory is sufficient (NO in S110, the first mode), the memory system performs a read operation in response to the read request RD_REQ and updates the normal read count N_RD_CNT by increasing the normal read count N_RD_CNT by 1 in operation S115.

When the free space of the host memory is insufficient (YES in S110, the second mode), the memory system determines that the read request RD_REQ received in operation S100 is a normal read request RD_REQ_N, in operation S120.

When the received read request RD_REQ is not a normal read request RD_REQ_N (NO in S120), the memory system determines that the received read request RD_REQ is a HPB read request RD_REQ_H. Thus, the memory system performs a read operation in response to the HPB read request RD_REQ_H and updates the HPB read count H_RD_CNT by increasing the HPB read count H_RD_CNT by 1 in operation S140. When the received read request RD_REQ is a normal read request RD_REQ_N, the memory system performs a read operation in response to the normal read request RD_REQ_N and updates the normal read count N_RD_CNT by increasing the normal read count N_RD_CNT by 1 in operation S150.

Then, the memory system determines whether the normal read count N_RD_CNT is equal to or more than a reference value, in operation S160. When the normal read count N_RD_CNT is less than the reference count (NO in S160), the memory system returns to operation S100, and performs the subsequent operations. When the normal read count N_RD_CNT is equal to or more than the reference value (YES in S160), the memory system determines whether the ratio of the normal read count N_RD_CNT to the sum of the normal read count N_RD_CNT and the HPB read count H_RD_CNT is equal to or more than a threshold value, in operation S180.

When the normal read count N_RD_CNT is equal to or more than the reference value (Yes in S160) and the ratio of the normal read count N_RD_CNT to the total read count is equal to or more than the threshold value (YES in S180), the memory system may determine that the map information currently stored in the host is cold map information. That is, the memory system may determine that the read requests received are mostly normal read requests including no physical address since physical addresses for frequently-read-requested data is not often in the metadata or the map information currently stored in the host memory.

Thus, the memory system resets the upload information of the map information currently stored in the host memory, in order to upload hot map information to the host, in operation S200. When the upload information is reset, the memory system may determine that the entire storage space of the host memory is a free area. The memory system may upload hot map information, corresponding to the storage space of the host memory, to the host.

After operation S200, the memory system may reset the normal read count N_RD_CNT and the HPB read count H_RD_CNT in operation S220.

On the other hand, when the normal read count N_RD_CNT is equal to or more than the reference value (YES in S160), but the ratio of the normal read count N_RD_CNT to the total read count is less than the threshold value (NO in S180), the memory system may determine that the map information currently stored in the host is hot map information. Thus, the map information currently stored in the host memory need not be replaced with another map information.

According to an embodiment, there may be multiple threshold values, i.e., a first threshold value and a second threshold value larger than the first threshold value. When the ratio of the normal read count N_RD_CNT to the total read count is equal to or more than the first threshold value, hot map information having a size to replace only the cold map information, among the pieces of map information currently stored in the host memory, may be uploaded to the host in operation S200. When the ratio of the normal read count N_RD_CNT to the total read count is equal to or more that the second threshold value, hot map information having a size to replace the entire map information currently stored in the host memory may be uploaded to the host in operation S200.

Figure 10:
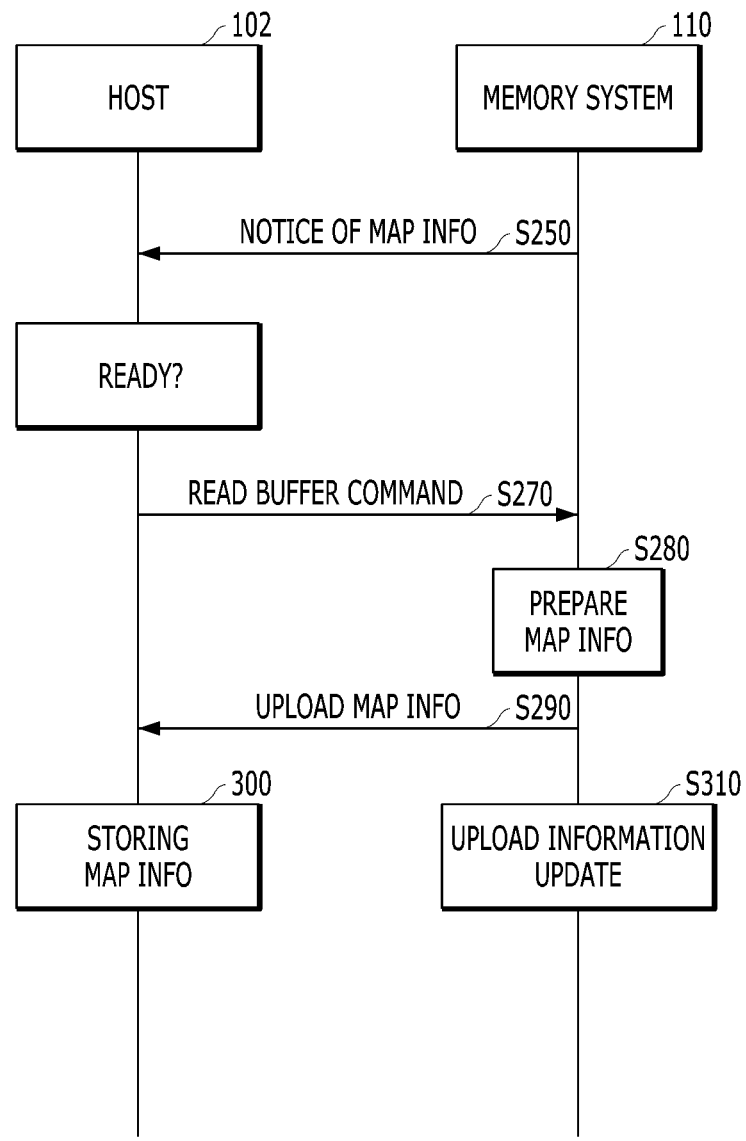
FIG. 10 is a flowchart illustrating an operation in which a memory system in accordance with an embodiment, uploads map information to a host.

FIG. 10 illustrates a process in which the memory system uploads hot map information to the host, after the upload information is rest in operation S200 of FIG. 9.

First, the memory system 110 may send, to the host 102, a notice for a request for updating the map information stored in the host 102, in operation S250.

Then, when the host 102 is ready to receive new map information from the memory system 110, the host 102 sends a read buffer command to the memory system 110, in order to read map information from the memory system 110, in operation S270.

In response to the read buffer command received from the host 102, the memory system 110 prepares map information to be uploaded to the host 102, in operation S280. The map information to be uploaded to the host 102 may be selected based on the read count RD_CNT. Then, the memory system 110 sends hot map information to the host 102 in operation S290, and the host 102 stores the hot map information in the host memory in operation S300. Then, the memory system 110 updates the upload information of the map information reset in operation S200 of FIG. 9, in operation S310.

Then, referring to FIGS. 9, 10 and 11A to 11E, an operation in which the memory system in accordance with an embodiment manages the host memory is described in detail.

In particular, the following description is based on the supposition that the host memory has a storage space capable of storing 5 pieces of map information, a reference value REF is '15', and a threshold value TH is '80%'.

Referring to FIG. 11A, the memory (144 of FIGS. 4 and 5) included in the controller (130 of FIGS. 4 and 5) stores map information MAP INFO including logical addresses LBA00 to LBA09 and physical addresses corresponding to LBA00 to LBA09. The upload information UPLOAD of each entry of MAP INFO including the logical addresses LBA00 to LBA04 uploaded to the host has a state value of '1', and the upload information UPLOAD of each entry of MAP INFO including the logical addresses LBA05 to LBA09 which are not uploaded to the host has a state value of '0'.

Furthermore, the host memory (106 of FIGS. 4 and 5) included in the host (102 of FIGS. 4 and 5) stores the uploaded entries of the map information MAP INFO including the logical addresses LBA00 to LBA04 and physical addresses corresponding to the logical addresses LBA00 to LBA04. The host memory stores map information corresponding to five logical addresses LBA00 to LBA04, and thus has no free space ('full' state, second mode).

The controller performs read operations in response to the plurality of read requests received from the host, until the normal read count N_RD_CNT becomes the reference value and the ratio of the normal read count N_RD_CNT to the total read count becomes the threshold value or more.

As illustrated in FIG. 11B, when the normal read count N_RD_CNT for normal read requests, among the 20 read requests RD_REQ00 to RD_REQ19 received after the host memory becomes 'full', becomes 17, which is larger than the reference value of 15, and the ratio of the normal read count N_RD_CNT to the total read count becomes 85%, which is larger than the threshold value of 80%, the controller may determine that the map information uploaded to the host is cold map information. That is, the memory system may determine that most of the read requests received are normal read requests including no physical address, since a physical address for frequently-read-requested data is not often included in the metadata or the map information currently stored in the host memory.

Thus, as illustrated in FIG. 11C, the controller resets the upload information of the map information currently stored in the host memory to '0' in order to upload hot map information to the host. When the upload information is reset, the controller may determine that the entire storage space of the host memory is a free area. The controller may upload hot map information, corresponding to the storage space of the host memory, to the host.

Then, the controller decides hot map information, based on the read count RD_CNT.

That is, as illustrated in FIG. 11D, the controller may determine that the map information of the logical addresses LBA04 to LBA08 having relatively high read counts RD_CNT is hot map information.

The controller may determine that the map information of the logical addresses LBA00 to LBA03 and LBA09 having relatively low read counts RD_CNT is cold map information.

As illustrated in FIG. 11D, the controller uploads the hot map information LBA04 to LBA08 to the host, and the host stores the hot map information in the host memory. Then, as illustrated in FIG. 11E, the controller updates the state value of the upload information UPLOAD of the map information, reset to '0' in FIG. 11C, to '1'.

As the host memory 106 is used as a buffer memory for storing map information as described above, the process of reading map information from the memory device 150 and storing the read map information again due to the limit to the storage space of the memory 144 within the memory system 110 may be omitted. Through this operation, the operation efficiency of the memory system 110 may be increased.

Furthermore, the memory system 110 in accordance with an embodiment may use some or a portion of the host memory 106 in the host 102 as a cache or buffer, and store the metadata in that portion* of the host memory 106, thereby overcoming the storage space limitation of the memory 144 used by the controller 130 within the memory system 110.

Although various embodiments have been illustrated and described, it will be apparent to those skilled in the art in view of the present disclosure that various changes and modifications may be made without departing from the spirit and scope of the invention as defined in the following claims.

What is claimed is:

1. A memory system comprising:
a nonvolatile memory device suitable for storing user data and metadata of the user data; and
a controller suitable for uploading at least some of the metadata to a host,
wherein in response to a determination that a size of a free space having no data stored therein in a storage space allocated to store the uploaded metadata within the host is equal to or less than a positive set value, a determination that a number of normal read requests received from the host is equal to or greater than a positive reference value, and a determination that a ratio of the number of normal read requests received from the host including no physical address to a sum of all read requests received from the host, is equal to or greater than a positive threshold value, the controller uploads hot metadata to the host, and
wherein the read request includes the normal read request including a logical address without the physical address and a Host-aware Performance Booster (HPB) read request including a logical address and a corresponding physical address.

2. The memory system of claim 1, wherein when the size of the free space is equal to or less than the set value, the controller manages a read count indicating the number of times that a read request for a specific logical address is made by the host.

3. The memory system of claim 2, wherein the controller selects the hot metadata based on the read count.

4. The memory system of claim 2, wherein the read count comprises a normal read count for normal read requests and a Host-aware Performance Booster (HPB) read count for the HPB read requests.

5. The memory system of claim 1, wherein the controller resets upload information on at least some of the metadata uploaded to the host to upload the hot metadata to the host.

6. The memory system of claim 1,
wherein, when the ratio of normal read requests to all read requests is equal to or more than a first threshold value, the controller uploads to the host hot metadata to replace cold meta data among the uploaded meta data.

7. The memory system of claim 6,
wherein when the ratio of normal read requests to all read requests is equal to or more than a second threshold value larger than the first threshold value, the controller uploads to the host hot metadata to replace all previously uploaded meta data.

8. The memory system of claim 1, wherein the metadata comprises map information including a logical address used by the host and a physical address of the memory device, corresponding to the logical address.

9. The memory system of claim 1, wherein the set value is equal to or more than 0.

10. An operating method of a memory system which includes a nonvolatile memory device suitable for storing user data and metadata of the user data and a controller suitable for uploading at least some of the metadata to a host, the operating method comprising:
determining whether a size of free space having no data stored therein, of a storage space allocated to store the uploaded metadata in the host is equal to or less than a set value; and
uploading hot metadata to the host in response to a determination that the size of the free space is equal to or less than the set value, a determination that a number of normal read requests received from the host is equal to or greater than a positive reference value, and a determination that a ratio of the number of the normal read requests received from the host including no physical address to a sum of all read requests received from the host is equal to or greater than a positive threshold value,
wherein the read request includes the normal read request including a logical address without the physical address and a Host-aware Performance Booster (HPB) read request including a logical address and a corresponding physical address.

11. The operating method of claim 10, wherein the uploading of the hot metadata to the host comprises managing a read count indicating the number of times that a read request for a specific logical address is made by the host.

12. The operating method of claim 11, wherein the uploading of the hot metadata to the host comprises selecting the hot metadata based on the read count.

13. The operating method of claim 11, wherein the read count comprises a normal read count for normal read requests and a Host-aware Performance Booster (HPB) read count for the HPB read requests.

14. The operating method of claim 10, wherein the uploading of the hot metadata to the host comprises resetting upload information on at least some of the metadata uploaded to the host.

15. The operating method of claim 10,
wherein uploading of the hot metadata to the host comprises uploading to the host hot metadata to replace cold meta data among the uploaded meta data, when the ratio of the normal read requests to all read requests is equal to or more than a first threshold value.

16. The operating method of claim 15,
wherein uploading of the hot metadata to the host comprises uploading to the host hot metadata to replace previously uploaded metadata, when the ratio of the normal read requests to all read requests is equal to or more than a second threshold value larger the first threshold value.

17. The operating method of claim 10, wherein the metadata comprises map information including a logical address used by the host and a physical address of the memory device, corresponding to the logical address.

18. The operating method of claim 10, wherein the set value is equal to or more than 0.

* * * * *